US008024218B2

(12) United States Patent
Kumar et al.

(10) Patent No.: US 8,024,218 B2
(45) Date of Patent: Sep. 20, 2011

(54) METHOD AND APPARATUS FOR DETERMINING THE PRODUCT MARKETABILITY UTILIZING A PERCENT COVERAGE

(75) Inventors: Ashutosh Kumar, Walldorf (DE); Stefan Witzens, Nussloch (DE); Oswald Wieser, Schwetzingen (DE)

(73) Assignee: SAP AG, Walldorf (DE)

( * ) Notice: Subject to any disclaimer, the term of this patent is extended or adjusted under 35 U.S.C. 154(b) by 1581 days.

(21) Appl. No.: 11/388,683

(22) Filed: Mar. 23, 2006

(65) Prior Publication Data

US 2007/0226040 A1 Sep. 27, 2007

(51) Int. Cl.
*G06F 9/44* (2006.01)
(52) U.S. Cl. .................. 705/7.33; 705/7.29; 705/7.31
(58) Field of Classification Search .............. 705/7.29, 705/7.31, 7.33
See application file for complete search history.

(56) References Cited

U.S. PATENT DOCUMENTS

| 6,859,785 | B2* | 2/2005 | Case ....................... 705/36 R |
| 7,349,838 | B2* | 3/2008 | Summers ...................... 703/22 |
| 7,546,257 | B2* | 6/2009 | Hoffman et al. .............. 705/28 |
| 7,769,626 | B2* | 8/2010 | Reynolds ................... 705/7.32 |
| 2002/0169658 | A1* | 11/2002 | Adler ............................ 705/10 |
| 2002/0178044 | A1* | 11/2002 | Bicknell et al. ................. 705/9 |
| 2003/0171978 | A1* | 9/2003 | Jenkins et al. ................. 705/10 |
| 2004/0199417 | A1* | 10/2004 | Baxter et al. .................. 705/10 |
| 2005/0055275 | A1* | 3/2005 | Newman et al. ............... 705/14 |

OTHER PUBLICATIONS

"Decision Support Systems for Marketing Managers", by John Little, Journal of Marketing, vol. 43, 1997.*
"Marketing Decision Support and Intelligent Systems", by Eric Eisenstein and Leonard Lodish, Jun. 2002.*
"Market Segment Response to the Marketing Decision Variables", by John McCann, Journal of Marking Research, vol. XI, pp. 399-412, Nov. 1974.*

* cited by examiner

*Primary Examiner* — Scott L Jarrett
*Assistant Examiner* — Pan Choy
(74) *Attorney, Agent, or Firm* — Kenyon & Kenyon LLP

(57) ABSTRACT

Determining product marketability may be accomplished by electronically performing various calculations on related data. The marketability may be determined by a processing device receiving business characteristic terms, industry sub-segment terms and validation terms for each business characteristic term of each industry sub-segment. The processing device calculates one or more criteria terms based on the validation terms and thereupon prioritizes the business characteristic terms based on the criteria data to define at least a first cluster of business characteristic terms. The processing device thereupon calculates a coverage percentage term for each of the industry sub-segment terms based on a comparison of the validation terms for each of the business characteristic terms and the validation terms for each business characteristic term in the first cluster. The coverage percentage term usable for determining product marketability.

15 Claims, 3 Drawing Sheets

|  | INDUSTRY SUB-SEGMENTS | | | | | BUSINESS CHARACTERS | |
|---|---|---|---|---|---|---|---|
|  | S1 | S2 | S3 | S4 | S5 | CRITERIA 1 | CRITERIA 2 |
|  |  |  |  |  |  | # OF EMPL. | # OF COUNTS |
| EMPLOYEES IN SEGMENT | 20 | 30 | 80 | 50 | 45 |  |  |
| BIZ CHAR LIST | INDUSTRY VALIDATION | | | | | | |
| B1 | 1 | 1 | 0 | 0 | 1 | 95 | 3 |
| B2 | 0 | 1 | 0 | 1 | 1 | 125 | 3 |
| B3 | 0 | 0 | 1 | 0 | 1 | 125 | 2 |
| B4 | 1 | 1 | 1 | 1 | 1 | 225 | 5 |
| B5 | 0 | 0 | 0 | 0 | 1 | 45 | 1 |
| B6 | 1 | 0 | 1 | 0 | 1 | 145 | 3 |

FIG. 4

| PRIORITY | 1ST | 2ND | 3RD | 4TH | 5TH | 6TH |
|---|---|---|---|---|---|---|
| BUSINESS CHARACTERISTIC | B4 | B6 | B2 | B3 | B1 | B5 |

FIG. 5

| CLUSTER | BUSINESS CHARACTERISTIC | INDUSTRY SUB-SEGMENTS | | | | |
|---|---|---|---|---|---|---|
|  |  | S1 | S2 | S3 | S4 | S5 |
| CLUSTER 1 | B4 | 1 | 1 | 1 | 1 | 1 |
| CLUSTER 1 | B6 | 1 | 0 | 1 | 0 | 1 |
| CLUSTER 1 | B2 | 0 | 1 | 0 | 1 | 1 |
| CLUSTER 1 | B3 | 0 | 0 | 1 | 0 | 1 |
| CLUSTER 2 | B1 | 1 | 1 | 0 | 0 | 1 |
| CLUSTER 2 | B5 | 0 | 0 | 0 | 0 | 1 |
| | TOTAL REQUIREMENTS | 3 | 3 | 3 | 2 | 6 |
| | TOTAL COVERAGE C_1 | 2 | 2 | 3 | 2 | 4 |
| | %AGE COVERAGE C_1 | 67% | 67% | 100% | 100% | 67% |

FIG. 6

METHOD AND APPARATUS FOR DETERMINING THE PRODUCT MARKETABILITY UTILIZING A PERCENT COVERAGE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to determining market predictability for one or more products and more specifically to calculating market predictability factors for determining underlying product development decisions.

In current operations, decisions made relating to product development is based on a wide variety of factors. One common approach is solving a need for a particular market. Product development relating to a market need is typically dictated by customer feedback or a recognition of missing solutions in the marketplace.

As the complexity of some products continues to increase, so does the inherent cost associated with developing a product. Costs are also associated in developing prototypes or commonly called "beta" versions with which a product may be tested. It is often beneficial to have a realistic understanding of the marketability of a product as early in the decision process as possible, especially in markets where profits can drive development and/or production decisions.

Certain areas of products are especially prone to high development or start-up costs. It can be extremely risky for a person or company to invest various resources, such as money and man-power, into a product that may end up having limited market value. One common product having significant development costs is software. Applications must be developed, typically by a team of software engineers. From a business perspective, just as important as the proper operation of the software is the marketability of the underlying software.

This issue is especially true in the example of software with enterprise applications. These enterprise applications provide a general framework for performing numerous operations, but are often specialized to a particular industry. As different industries include different requirements, it can be expensive to develop industry specific applications without a clear understanding of the market to which the software is applicable.

Current techniques for determining potential marketability for a particular product involve business calculations. These calculations may include empirical industry specific data. From this data, business calculations may be made generally estimating a products marketability. For example, a simple calculation may be estimating the total number of customers in an industry with a percentage factoring the number of customers to whom the company can expect to sell its product. Taking that portion of the industry, the company performs further calculations to determine a price point estimating the projected cost of the product. Based on this price point and estimate sales volume, an income amount may be projected.

This current technique is extremely subjective and can be prone to calculation errors. For example, the definition of a particular industry may be in error or there may be a miscalculation of the potential number of future customers. Additionally, this technique is predicated on a selected market and then a corresponding determination for that market. Therefore, should a person wish to compare a large number of potential markets, that would require not only the calculations for each market, but the significant research required to obtain accurate values for each market-based calculation.

Therefore, the current techniques for determining a product's marketability require a per-market determination. These determinations require extensive amounts of data collection for each calculation and may be potentially subject to problems associated with incorrect data. As such, when product development is determined based in part on the marketability of that product, development may be hindered by the currently complex and imprecise market data estimations.

BRIEF DESCRIPTION OF THE DRAWINGS

FIG. 4 illustrates a chart of multiple data terms used in a first portion of the electronic determination of product marketability;

FIG. 5 illustrates a chart of a priority ranking of business characteristic terms as determined by calculations from the chart of FIG. 4; and FIG. 6 illustrates a chart of multiple data terms used in a second portion of the electronic determination of product marketability.

DETAILED DESCRIPTION

In a product development process, addressing the needs of the underlying markets is extremely important to having market driven product development. In determining a market driven approach to product development, a processing system seeks to answer questions of the requirements for providing maximum penetration within the particular product market, what elements of the product are needed for a defined target market, what are the anticipated or recommended subsequent markets and where does the product relate to competing products. It is through processing operations based on defined data sets relating to business characteristics, industry sub-segments and validation data that the above solutions may be provided.

Figure 1:
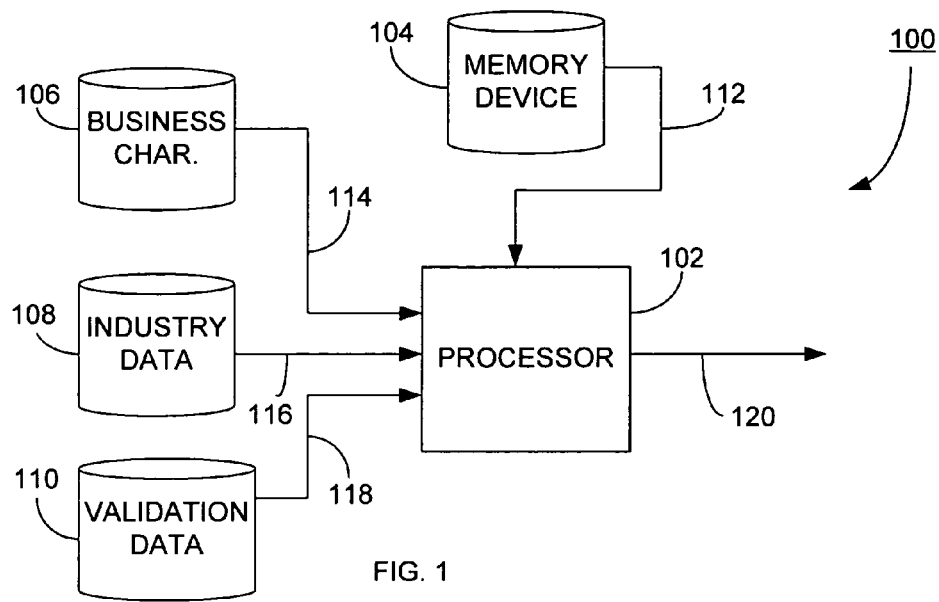
FIG. 1 illustrates a block diagram of one embodiment of an apparatus for electronically determining product marketability.

FIG. 1 illustrates a block diagram of an apparatus 100 including a processor 102 and a memory device 104. In the embodiment illustrated in FIG. 1, the apparatus 100 further includes a business characteristic database 106, an industry data database 108 and a validation data database 110. The processing device 102 may be one or more processing elements operative to perform various processing operations in response to executable instructions. The memory device 104 may be one or more memory elements having executable instructions 112 stored therein and the instructions 112 provideable to the processing device 102. In one embodiment, the memory device 104 may be a computer readable medium having the executable instructions 112 encoded thereon, such that when the memory device 104 is read by an appropriate medium reading device, the executable instructions 112 are read therefrom and provided to the processing device 102.

The business characteristic database 106, industry data database 108 and validation data database 110 may be one or more data storage devices having data stored therein. These data storage devices 106, 108 and 110 may be local or remote to the processing device 102, in operative communication across one or more available communication paths. The data in the data storage devices 106, 108 and 110 may be provided through the processor 102 using recognized data input techniques or in another embodiment, the databases 106, 108 and/or 110 may be populated with data from other suitable external sources.

In one embodiment, the processing device 102 receives the executable instructions 112 from the memory device 104. In response to the instructions 112, the processing device 102 retrieves business characteristic terms 114 from the business characteristic database 106. The business characteristic terms 114 include specific terms defining characteristics of a business and/or business operation. The business characteristic terms 114 describe key aspects of a company's business system excluding commodity features, such as cross-industry innovative characteristics, industry differentiating characteristics and industry unique characteristics. For example, business characteristic terms may include whether a business is subject to a particular form of regulation, such as regulation under the Food and Drug Administration (FDA), whether a business utilizes electronic data interchange (EDI) business process automation, whether a business is required to comply with regulatory concerns, for example such as having to comply with Sarbanes-Oxley, whether a business engages in subcontracting operations, and other characteristics. The business characteristic terms may be any suitable term defining a component or aspect of one or more business operations.

In the processing device 102, the business characteristic terms 114 may be general terms relating to all types of business or may be specific to a particular industry. The processing device 102 may request specific business characteristic terms 114, collectively the terms are referred to as a business characteristic list.

Additionally, in response to the executable instructions 112, the processing device 102 retrieves industry data 116 from the industry data database 108. The industry data 116 includes an industry term defining a general industry as well as sub-segment terms that define sub-segments of a particular industry. For example, an industry term may be software companies and the industry sub-segment terms may be, for example, various software segments such as an enterprise resource planning (ERP) segment, an entertainment segment, a productivity (i.e. word processing and spreadsheet) segment, and other suitable segments. The industry data 116 may be globally defined for multiple operations providing standard comparable data between different computations, as described in further detail below. Additionally, the industry data 114 may be retrieved from or compiled from an outside source, such as using a recognized third party definition of industry segments and sub-segments. In one example, the industry data, including segment terms and sub-segment terms in the industry data database 108 may be defined by the standard industrial classification (SIC) codes as utilized by the standard industrial classification index.

Based on the business characteristic terms and the industry sub-segment terms, the processing device 102 is operative to retrieve validation data 118 from the validation data database 110. The validation data 118 includes predetermined classifications of the business characteristic terms as they relate to specific industry sub-segments.

The validation data includes validation terms having a corresponding value associated with the level of validation. For example, one embodiment may include a scale range from zero (0) to one (1). In this embodiment, a validation term of zero indicates that the particular business characteristic has little or no relevance to the industry sub-segment, a validation term of five tenths (0.5) indicates the particular business characteristic would be nice to have for the industry sub-segment and a validation term of one (1) indicates that the business characteristic is mandatory for the industry sub-segment. In one embodiment, the validation data 118 is based on direct feedback with experts within particular industries or sub-segments. For example, user interaction may be utilized to inquire about various levels of industry or sub-segment specific information that is then used for assigning the validation terms to the business characteristics for each sub-segment.

The processing device 102 having the business characteristic terms, the industry sub-segment terms and the validation terms is operative to perform various operations based on the executable instructions 112. A first operation is to calculate one or more criteria terms based on the validation terms. The criteria terms are specific terms having associated data values based on the criteria defined by the term. In one example, a first criteria term may be a number of employees for each of the industry sub-segments for each business characteristic term and a second criteria term may be the number of mandatory business characteristics for a business characteristic term.

The processing device 102 calculates the criteria terms by comparing the validation terms for each business characteristic term relative to each industry sub-segment, as illustrated and described in further detailed below relative to FIG. 4. In the below example, the first criteria terms is calculated based on the addition of the number of employees for each industry sub-segment having a corresponding one (1) validation term for each business characteristic and the second criteria term is calculated based on the tracking of the number of one (1) validation terms.

Based on these calculated criteria terms, the processing device 102 is further operative to prioritize the business characteristic terms in the business characteristics list. Within that prioritized list, the processing device 102 categorizes the terms into groupings or clusters. For grouping the business characteristic terms into clusters, the processing device may include preset guidelines based on available data. For example, a percentage cut-off may be utilized based on the criteria terms such that the first cluster incorporates a top percentage of calculated criteria data for each of the business characteristic terms.

The processing device 102, further in response to executable instructions, calculates a total requirements term based on the validation data for each industry sub-segment. In one embodiment, all of the validation terms relating to the business characteristic terms for each industry sub-segment term are added up. This total sum represents the total requirements term, where there is a total requirements term per industry sub-segment.

Next, the processing device 102, based on the executable instructions, calculates a first cluster coverage term. In one embodiment, all of the validation terms relating to the business characteristic terms in the first cluster for each industry sub-segment are added up. Thereupon, the processing device 102 calculates a coverage percentage term for each of the industry sub-segment terms. This coverage percentage term is based on a comparison of the validation terms for each of the business characteristic terms and the validation terms for each of the business characteristic terms in the first cluster. In one embodiment, the coverage percentage term may be first cluster requirements term divided by the total requirements term for each industry sub-segment.

The processing device 102 is operative to thereupon output the coverage percentage term 120. This term 120 may be provided for the determination of a product marketability because, among other things, the term 120 provides a direct comparison of business characteristics for various market sub-segments based on validation data. It is further recognized that the processing device 102 may perform other operations with the term data and provide various alternative output signals indicating the coverage percentage for the first cluster, such as providing a list of the industry sub-segments and the corresponding percentage terms ordered from highest to lowest. It is also recognized that the processing device 102 may perform further operations or alternative operations for various calculations that may provide equivalent data analysis as described above.

Figure 2:
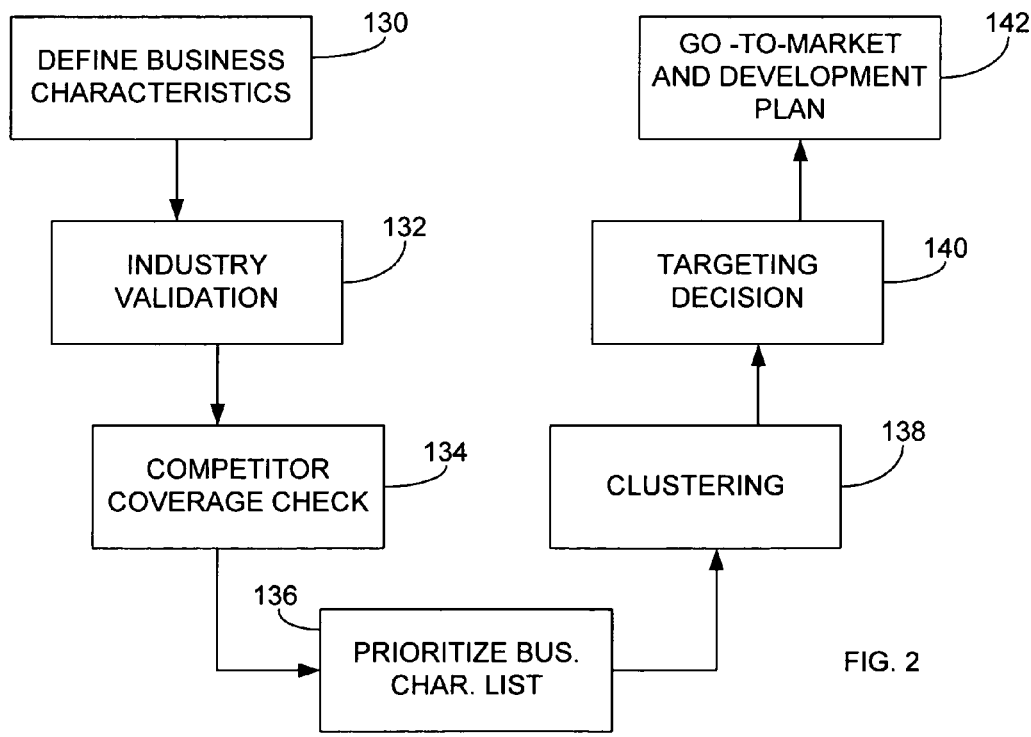
FIG. 2 illustrates a flowchart of the conceptual steps of one embodiment of a method for electronically determining product marketability.

FIG. 2 illustrates the steps of a flow diagram of one technique for determining product marketability and developing a product driven go-to market plan. The first step, step 130 is defining business characteristic terms. As described above, these terms may be defined relative to various components of industries and can be defined based on any number of factors, including response from feedback from experts in various industries. The business characteristic terms may be general terms that are later assigned to various industries and sub-segments. The business characteristic terms provide the foundation for the underlying calculations to determine the product driven go-to market approach.

The next step, step 132, is receiving industry validation terms. These terms are typically defined by experts in the industry sub-segments and can be calculated based on feedback from such experts. The validation terms are defined relative to each business characteristic for each sub segment.

The next step, step 134, is determining the market coverage of competitors for the industry sub-segments. This determination may be accomplished through research of market data for competitors in the industry sub-segments, such as determining the number of customer's that each competitor has in the sub-segments. In one embodiment, a numerical assignment may be utilized to indicate various levels of competitor coverage, such as a value of zero (0) indicating the sub-segment is not covered and a value of one (1) indicating the sub-segment as having excellent coverage, with appropriate intervening levels having values between zero and one.

The next step, step 136, is prioritizing the business characteristic terms in the business characteristic list. This step may be performed by examining the calculated criteria data that is calculated based on the validation data relative to the business characteristic terms and industry sub-segment terms. The next step, step 138, is to cluster the business characteristic terms. As described above, this step may be done using defined guidelines for the calculated criteria data, such as all business characteristic terms having a criteria value within a first range are in the first cluster and the other business characteristic terms are in the second cluster. It is recognized that other techniques as recognized by one skilled in the art may be utilized.

The next step, step 140, is generating a targeted decision. This targeted decision includes the calculation of the coverage percentage term for each of the industry sub-segment terms. Based on the coverage percentage term, the targeted decision can be generated to indicate business characteristics in the first cluster for corresponding industry sub-segments. The final step of this embodiment, step 142, is developing the product driven go-to market plan. This plan may include further additional aspects of product development, but also include the targeted decision from step 140 indicating calculated favorable benefits of product characteristics for particular industry sub-segments.

Figure 3:
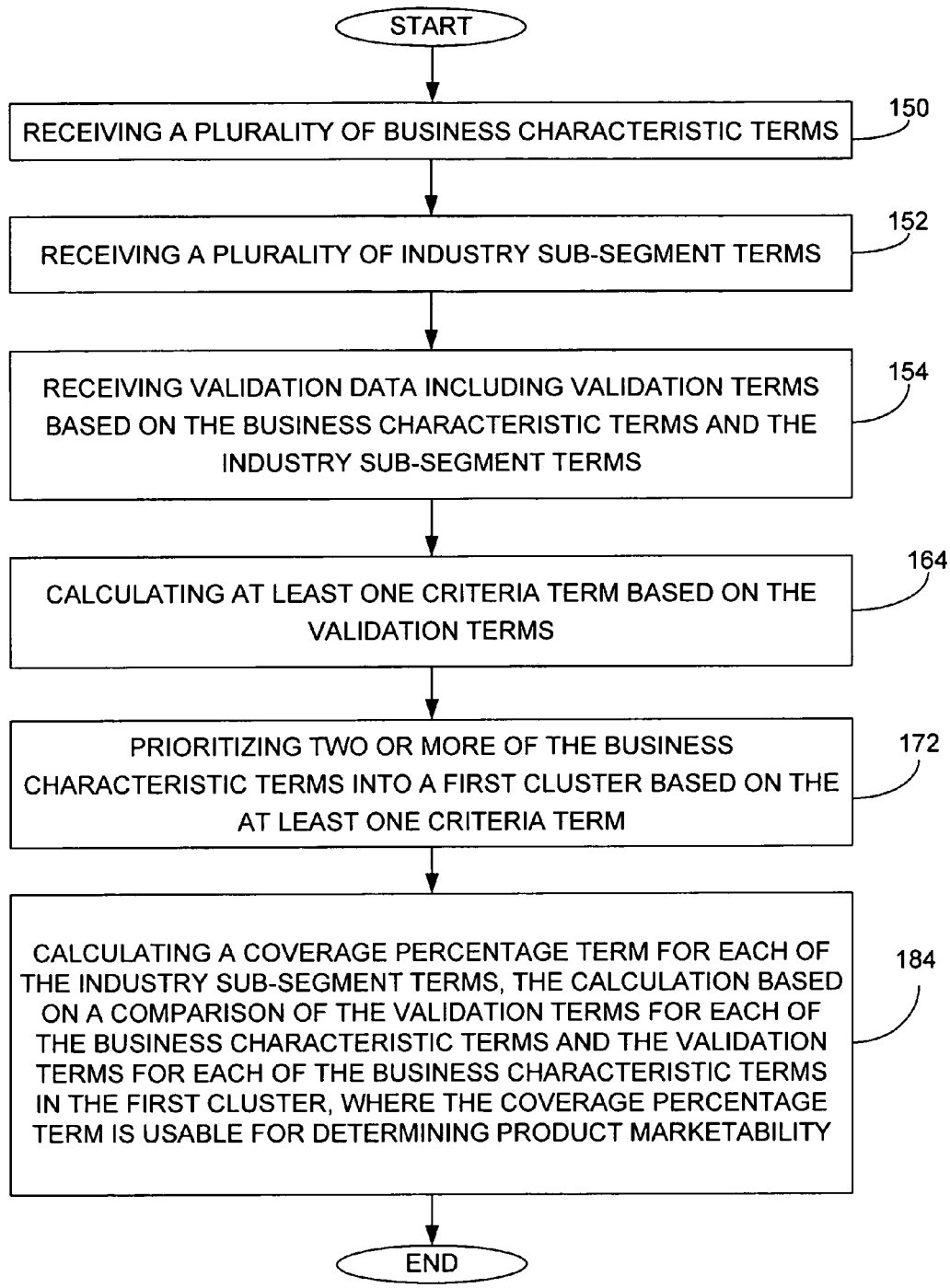
FIG. 3 illustrates a flowchart of the steps of one embodiment of a method for electronically determining product marketability.

FIG. 3 illustrates a flowchart of the steps of one embodiment of a method for determining product marketability. These operations may be performed by a processing device (such as device 102 of FIG. 1) in response to executable instructions from a memory device or a computer readable medium. The first step, step 150, is receiving a plurality of business characteristic terms. As described above, these terms define various characteristics of one or more industries. In one embodiment, the business characteristic terms are received from a storage device, such as the database 106 of FIG. 1.

The next step of the method, step 152, includes receiving a plurality of industry sub-segment terms. These terms list various sub-segments of one or more industries and can be categorized by defined guidelines, such a SIC codes. Additionally, these industry sub-segment terms may be received from a storage device, such as the database 108 of FIG. 1.

The next step of the method, step 154, includes receiving validation data including validation terms. This step 154, includes receiving the validation terms based on the business characteristic terms and the industry sub-segment terms. As described above, these validation terms include a value or other identifier for each business characteristic term for each industry sub-segment. These validation terms may be received from a storage device, such as the database 110 of FIG. 1.

FIG. 4 illustrates one embodiment of a chart 156 including columns of industry sub-segment terms 158 and a business characteristic list having business characteristic terms 160. In the illustrated exemplary chart 156, there are five industry sub-segments, S1 through S5, and six business characteristics in the list, B1 through B6. The industry sub-segments 158 and business characteristics 160 are arranged in a five by six matrix array. Within the matrix are the validation terms 162, where each term relates to both an industry sub-segment and a business characteristic. For example, the third business characteristic term (B3) for the third industry sub-segment (S3) has a validation value of one (1). Using the above description, the validation term value of one (1) may indicate that the business characteristic is essential to the particular industry sub-segment.

Referring back to FIG. 3, the next step, step 164 is calculating at least one criteria term based on the validation terms. It is recognized that criteria data may be included in the industry sub-segment data, such as the criteria data of the number of employees in the particular industry sub-segment. The chart of FIG. 4 illustrates this exemplary criteria data 166 for each industry sub-segment. The step of calculating the criteria term may be performed by referencing the validation terms with industry sub-segment terms for each business characteristic term. In the chart of FIG. 4, a first criteria term 168 is calculated for each business characteristic term 160 by multiplying the validation terms 162 with the criteria data 166 for each sub-segment 158. For example, for the second business characteristic term (B2), the criteria term is 125, calculated by combining the employee number terms of 30, 50 and 45 for industry sub-segments S2, S4 and S5 respectively.

Additionally, this step, step 164, may include calculating additional criteria terms, such as the second criteria term 170 which is the number of one (1) validation term values for each business characteristic term. For example, the fifth business characteristic term (B5) includes a second criteria term of one (1) because the only industry sub-segment having a validation term of one (1) is the fifth industry sub-segment (S5).

The next step of the method, step 172, is prioritizing two or more of the business characteristic terms into a first cluster based on at least one of the criteria terms. FIG. 5 illustrates a table 174 of the business characteristic terms 160 in a priority list 176. This priority 176 is generated, in this exemplary embodiment, by the criteria data including a ranking of the terms 160 by the number of employees 168. Additionally, this priority 176 is also based on the number of validations in the second criteria data 170. In this example, both business characteristic terms B2 and B3 have the same number of employees (125), but term B2 is given a higher priority than B3 because second criteria data of B2 (the value 3) is greater than the second criteria data of B3 (the value 2).

FIG. 6 illustrates a table 178 with the business characteristic terms 160 grouped into a first cluster 180 and a second cluster 182. As described above, the grouping of the cluster may be performed by categorizing the criteria data, such as all business characteristic terms having a value of the first criteria data 168 over one hundred (100) is within the first cluster 180. It is recognized that other suitable techniques may be utilized for grouping the business characteristic terms into clusters.

Referring back to FIG. 3, the final step of this embodiment of the method, step 184, includes generating a coverage percentage term for each of the industry sub-segment terms based on a comparison of the validation terms for each of the business characteristic terms and the validation term for each of the business characteristic terms in the first cluster.

As illustrated in the chart of FIG. 6, validation terms 162 are referenced again for each business characteristic term 160 relative to each industry sub-segment term 158 in another matrix array. Based on this matrix, three totals are calculated. The first total is a total requirements term 186, which in this embodiment is a summation of the validation terms for each business characteristics term for each industry sub-segment term 158. For example, the total requirements term for the third industry sub-segment (S3) has a value of three (3) based on validation term values of one (1) for business characteristic terms B4, B6 and B3.

The second total calculated is a first cluster coverage term 188. This term 188, in this embodiment, is the summation of validation terms for business characteristics in the first cluster 180. For example, the first cluster coverage term for the second industry sub-segment (S2) is two (2) based on validation terms of one (1) for business characteristic terms B4 and B2, ignoring the validation term for business characteristic term B1 because this term is in the second cluster 182.

From these total requirements terms 186 and the first cluster coverage terms 188, the coverage percentage terms 190 is calculated. In this embodiment, the term 190 is calculated as the ratio of the first cluster coverage term 188 over the total requirements term 186. These coverage percentage terms 190 provide an indication of the applicability of business characteristics to a various industry sub-segments. This coverage percentage term is then usable for determining product marketability because the percentage represents a potential market for a product having capabilities associated with various business characteristics to particular industry sub-segments. This term may provide empirical computational relationships between business characteristics that can be incorporated into one or more products as well as an indication of the applicability of these business characteristics to specific industry sub-segments. As such, the method of the embodiment of FIG. 3 is therefore complete.

There also exists other available embodiment and techniques for formulating the underlying marketability data, as recognized by one having ordinary skill in art. Additionally, there exists further available uses of the data beyond calculating the coverage percentage term 190. The calculated data may include corresponding graphical representations of the criteria data relative to different industry sub-segments. Additionally, this method allows for automated calculations on various levels of data, so comparisons may be explored by adjusting business characteristic terms or different industry sub-segments. It is also noted that the illustrated example of the charts of FIGS. 4-6 utilize a sample number of business characteristics and industry sub-segments, but the method is equally applicable to calculations involving a large number of business characteristic terms and a large number of industry sub-segment terms. And through this processing of the business characteristic data based on validation terms for each defined industry sub-segments, corresponding applicable data can be readily calculated to determine the product driven go-to market approach. Through this product driven go-to market approach, a developer may avoid unnecessarily dedicating resources to products have limited marketability. In one example, this technique may be usable in developing or advancing software products by determining marketability prior to product development.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A computer-implemented method for electronically determining product marketability, the method comprising:
   receiving, by a processor from a data storage device, a first data object representing a plurality of business characteristic terms each indicating a characteristic measurement of a business operation;
   receiving, by the processor from the data storage device, a second data object representing a plurality of industry sub-segment terms each defining a market segment of an industry;
   receiving, by the processor from the data storage device, a validation data structure, each element of the validation data structure indicating a validation term that is associated with a specific business characteristic term and a specific industry sub-segment term, the validation term indicating whether the specific business characteristic term is essential with respect to the specific industry sub-segment term;
   calculating, by the processor, at least one array of criteria terms based on the validation terms of the validation data structure;

prioritizing, by the processor, the criteria terms of the at least one array into an ordered sequence based on values of the criteria terms of the at least one array;
grouping, by the processor, the ordered sequence into a plurality of clusters based on a comparison of the at least one criteria term against a threshold value;
calculating, by the processor, a coverage percentage term for each of the industry sub-segment terms, the calculation based on a comparison of the validation terms for each of the business characteristic terms and the validation terms for each of the business characteristic terms in a selected cluster;
the calculation of the coverage percentage term for each of the industry sub-segment terms further includes:
calculating, by the processor, a total requirements term for each of the industry sub-segment terms by summing validation terms for each of the business characteristic terms for each of the industry sub-segment terms;
calculating, by the processor, a first cluster coverage term for each of the industry sub-segment terms by summing validation terms for each of the business characteristic terms in the first cluster for each of industry sub-segment terms; and
calculating, by the processor, the coverage percentage based on a ratio of the first cluster coverage term and the total requirements term; and
outputting the coverage percentage term as an indicator of the product marketability.

2. The method of claim 1 wherein each of the business characteristic terms defines at least one characteristic of a business within a defined market.

3. The method of claim 2 further comprising: receiving an industry segment term, wherein the industry sub-segment terms define market segments of the industry segment term.

4. The method of claim 3 wherein the validation terms include expert data calculated by a comparison of the characteristic of the business characteristic term with the market segment of the industry term.

5. The method of claim 1 wherein a first criteria term is an employee number term and a second criteria term is a validation count term, the method further comprising:
calculating the first criteria term based on a combination of validation terms and employee number terms; and
calculating the second criteria term based on the validation terms for each of the business characteristic terms.

6. An apparatus for determining product marketability comprising:
a memory device storing executable instructions therein; and
a processing device, in response to the executable instructions, operative to:
receive a first data object representing a plurality of business characteristic terms each indicating a characteristic measurement of a business operation;
receive a second data object representing a plurality of industry sub-segment terms each defining a market segment of an industry;
receive a validation data structure, each element of the validation data structure indicating a validation terms that is associated with a specific business characteristic term and a specific industry sub-segment term, the validation term indicating whether the specific business characteristic term is essential with respect to the specific industry sub-segment term;
calculate at least one array of criteria terms based on the validation terms of the validation data structure;
prioritize the criteria terms of the at least one array into an ordered sequence based on values of the criteria terms of the at least one array;
grouping, by the processor, the ordered sequence into a plurality of clusters based on a comparison of the at least one criteria term against a threshold value;
calculate, by the processor, a coverage percentage term for each of the industry sub-segment terms, the calculation based on a comparison of the validation terms for each of the business characteristic terms and the validation terms for each of the business characteristic terms in a selected cluster
the cover percentage term calculation further includes:
calculate a total requirements term for each of the industry sub-segment terms by summing validation terms for each of the business characteristic terms for each of the industry sub-segment terms;
calculate a first cluster coverage term for each of the industry sub-segment terms by summing validation terms for each of the business characteristic terms in the first cluster for each of industry sub-segment terms; and
calculate the coverage percentage based on a ratio of the first cluster coverage term and the total requirements term,
output the coverage percentage term as an indicator of the product marketability.

7. The apparatus of claim 6 further comprising:
a business characteristics database including at least one business character list having a plurality of the business characteristic terms, wherein each of the business characteristic terms defines at least one characteristic of a business within a defined market.

8. The apparatus of claim 7 further comprising:
an industry segment database including industry segment terms, wherein the industry sub-segment terms define market segments of the industry segment term.

9. The apparatus of claim 8 further comprising:
a validation data database having the validation terms stored therein, the validation terms including expert data calculated by a comparison of the characteristic of the business characteristic term with the market segment of the industry term.

10. The apparatus of claim 6 wherein a first criteria term is an employee number term and a second criteria term is a validation count term, the processing device is further operative to:
calculate the first criteria term based on a combination of validation terms and employee number terms; and
calculate the second criteria term based on the validation terms for each of the business characteristic terms.

11. A computer readable medium including executable instructions that when read by a processing device provide for:
receiving, by a processor from a data storage device, a first data object representing a plurality of business characteristic terms each indicating a characteristic measurement of a business operation;
receiving, by the processor from the data storage device, a second data object representing a plurality of industry sub-segment terms each defining a market segment of an industry;
receiving, by the processor from the data storage device, a validation data structure, each element of the validation data structure indicating a validation term that is associated with a specific business characteristic term and a specific industry sub-segment term, the validation term indicating whether the specific business characteristic term is essential with respect to the specific industry sub-segment term;

calculating, by the processor, at least one array of criteria terms based on the validation terms of the validation data structure;

prioritizing, by the processor, the criteria terms of the at least one array into an ordered sequence based on values of the criteria terms of the at least one array;

grouping, by the processor, the ordered sequence into a plurality of clusters based on a comparison of the at least one criteria term against a threshold value;

calculating, by the processor, a coverage percentage term for each of the industry sub-segment terms, the calculation based on a comparison of the validation terms for each of the business characteristic terms and the validation terms for each of the business characteristic terms in a selected cluster;

the calculation of the coverage percentage term for each of the industry sub-segment terms further includes:

calculating, by the processor, a total requirements term for each of the industry sub-segment terms by summing validation terms for each of the business characteristic terms for each of the industry sub-segment terms;

calculating, by the processor, a first cluster coverage term for each of the industry sub-segment terms by summing validation terms for each of the business characteristic terms in the first cluster for each of industry sub-segment terms; and calculating, by the processor, the coverage percentage based on a ratio of the first cluster coverage term and the total requirements term; and outputting the coverage percentage term as an indicator of the product marketability.

12. The computer readable medium of claim 11 wherein each of the business characteristic terms defines at least one characteristic of a business within a defined market.

13. The computer readable medium of claim 12 including further executable instructions that when read by the processing device provide for:

receiving an industry segment term, wherein the industry sub-segment terms define market segments of the industry segment term.

14. The computer readable medium of claim 13 wherein the validation terms include expert data calculated by a comparison of the characteristic of the business characteristic term with the market segment of the industry term.

15. The computer readable medium of claim 13 wherein a first criteria term is an employee number term and a second criteria term is a validation count term, the computer readable medium including further executable instructions that when read by the processing device provide for:

calculating the first criteria term based on a combination of validation terms and employee number terms; and calculating the second criteria term based on the validation terms for each of the business characteristic terms.

\* \* \* \* \*